United States Patent [19]
Pall et al.

[11] 3,867,294
[45] Feb. 18, 1975

[54] CYLINDRICAL FILTER ELEMENTS WITH IMPROVED SIDE SEAM SEAL

[75] Inventors: David B. Pall, Roslyn Estates; Tadas K. Jasaitis, Great Neck, both of N.Y.

[73] Assignee: Pall Corporation, Glen Cove, N.Y.

[22] Filed: May 9, 1973

[21] Appl. No.: 358,567

[52] U.S. Cl. ............... 210/489, 210/492, 210/493, 210/497
[51] Int. Cl. ............................................. B01d 27/06
[58] Field of Search ........... 210/493, 497, 457, 489, 210/492; 55/486, 487, 498

[56] References Cited
UNITED STATES PATENTS

| | | | |
|---|---|---|---|
| 3,246,766 | 4/1966 | Pall | 210/493 |
| 3,283,904 | 11/1966 | Buckman et al. | 210/497 |
| 3,407,252 | 10/1968 | Pall et al. | 210/493 |
| 3,570,675 | 3/1971 | Pall et al. | 210/493 |
| 3,591,010 | 7/1971 | Pall et al. | 210/493 |

*Primary Examiner*—Charles N. Hart
*Assistant Examiner*—F. F. Calvetti

[57] ABSTRACT

Cylindrical filter elements are provided having an improved side seam seal, which can be bonded to end caps in a leak-tight manner.

10 Claims, 6 Drawing Figures

CYLINDRICAL FILTER ELEMENTS WITH IMPROVED SIDE SEAM SEAL

Cylindrical filter elements have a filter sheet formed in a cylindrical configuration, with the open ends of the cylinder closed off by end caps bonded to the ends of the filter sheet. It is essential that the end caps be bonded securely to all portions of the filter sheet, so as to compel fluid passing between the interior and the exterior of the filter cylinder to proceed by way of the filter sheet. Such cylindrical filter elements can be arranged to accept fluid flow either from the inside out, or from the outside in, but in either case all flow must pass through the filter sheet.

In the manufacture of cylindrical filter elements with ultrafine removal ratings, generally in the range of 5 microns to 0.2 micron or less, it is frequently advantageous to use a very thin filter sheet, since a thin sheet presents less resistance to fluid flow than a thick one. Such sheets tend to be fragile, and it is for this reason desirable to reinforce the thin sheet against rupture due to applied pressure in both directions, and against mechanical damage by handling during and after fabrication, by surrounding it with relatively thicker and stronger layers of more open foraminous sheet materials, such as, for example, tough long fibered papers, including hemp and cotton fiber papers.

In the manufacture of such cylindrical filter elements from one or more sheets of filter material, it is customary to fold the sheet or sheets into the form of a cylinder, either straight or with corrugations, to increase the useful area of filter sheet within a confined space, and then join the opposite ends of the filter sheet in a side seam which is bonded with a bonding agent or adhesive strip or coating between the opposed faces. In forming the seam, usually the two outside surfaces of the ends of the sheet are brought together. One or both of the opposed surfaces is coated with adhesive before the surfaces are brought into contact, and the seal is then formed by application of heat to set the adhesive. A seam is formed in which a layer of adhesive extends from end to end of the seam, and across the seam from the outer surface to the inner surface of the filter sheet, and this layer of adhesive is presented endwise to the filter cap.

When the filter element is in the ultrafine category as described above, and contains coarser protective layers about the fine filtering layers, it is very difficult in practice to obtain a tight seal throughout the two coarse layers which are interposed between the two fine layers at the side seal. This difficulty arises in part because an adhesive of sufficiently low viscosity to penetrate the coarser layers tends to be rapidly drawn away by the finer capillarity of the fine filter sheet. For this reason, such seals tend to be very unreliable, and permit passage of solids through the filter element by edgewise flow through the two interposed coarser layers at the side seal.

The adhesive systems used to bond the end caps to the ends of the side sealed pack usually adhere very well to the filter media layers, since these are porous, and consequently absorb some of the adhesive, forming a good bond. The same is not true in relation to the layer of adhesive of which the side seal is composed, and in many systems there is zero adhesion at this point. Consequently, it frequently happens that a poor seal is formed at the adhesive layer, with the result that a leakage path can be formed under fluid pressure across the filter element, since the adhesive extends from the outer surface to the inner surface of the filter sheet across the seam. The result is a potential bypass route for fluid which does not pass through the filter.

Canadian Pat. No. 742,053 issued Sept. 6, 1966 to David B. Pall and Herbert L. Forman describes a reversed lapped seam side seal, wherein outer surfaces of the adjacent sheet portions are brought together in face-to-face relationship, with a self-sustaining ribbon of bonding agent therebetween bonding the sheet portions together to form a leak-proof seal. However, in this type of seam also the bonding agent extends from end to end of the filter, and from inner surface to outer surface of the filter sheet, and consequently the same bonding problem to the end cap is presented.

A potential leakage path of this sort cannot be tolerated in cylindrical filter elements in which the filter sheet is of a pore size such that the filter can be used in filtering out yeasts or bacteria. The development of such leakage path in use under high fluid pressure, even if the fluid pressure be extraordinary and well beyond the normal fluid pressure, will result in organisms' bypassing the filter, with possibly disastrous consequences. The result is that for ultrafine filter use, it is not always possible to use cylindrical filter elements, particularly when high internal fluid pressures are apt to be encountered.

In accordance with the invention, a cylindrical filter element is provided comprising filter sheet material formed in a substantially cylindrical shape, and having opposite sheet end portions folded over with outer and inner end surfaces in adjacent relation and joined together in a side seam seal wherein portions of the sheet adjacent the sheet ends have one surface in face-to-face closely-abutting contact, extending to the end edges of the sheet, and the next-adjacent portions have the other surface opposite each other, extending beyond the end edges of the end portions of the sheet, and spaced apart by the folded-over abutting sheet ends, the opposed surfaces of the sheet ends and the end edges of the sheet ends defining a space therebetween, with a bonding agent in the space bonding the sheets together at the end edges and the opposed surfaces of the sheet substantially without penetrating the face-to-face end portions of the sheet at the seam to the outer surface of the filter sheet.

Thus, the sheet ends are exposed directly to the sealing adhesive, and since the ends of the fine filter sheet layer are similarly exposed, there is no hindrance to the accomplishment of a reliable seal to the ends of the fine filter sheet, and bypassing through the coarser protective layers cannot occur.

Further, in this side seam seal there is filter sheet material available for bonding to the filter end caps without interference by an end of the bonding agent layer, and although there is a layer of bonding agent at the end cap, it does not extend from the inner surface to the outer surface of the filter sheet material. Consequently, no potential leakage path exists at the end cap, due to the bonding agent holding the side seam seal together.

As the bonding agent, a self-sustaining ribbon of bonding agent can be used, of a thickness chosen to just fill the space between the ends of the filter sheet and the opposed nextadjacent surfaces. Application of heat through conventional means causes the ribbon to soften and melt, and produces a leak-proof bond throughout this space. The ribbon can be the type of resin which solidifies on cooling ("hot melt" adhesive) or it can be of the type which polymerizes on heating, but in either event it must reach a low enough viscosity for a sufficient time to penetrate slightly into the filter medium. As an alternate, a material which solidifies by polymerizing can be applied as a liquid. In either case, the temporary application of a strip of pressure-sensitive tape across each end prevents the molten material from running out, and causes it to harden neatly flush with the ends of the cylinder. The use of a self-sustaining ribbon instead of a coating makes it possible to obtain uniform thickness and width of the bonding agent throughout this space, so that the bonding agent layer is absolutely uniform from end to end of the filter cylinder.

The invention is illustrated in the accompanying drawings, in which.

Figure 4:
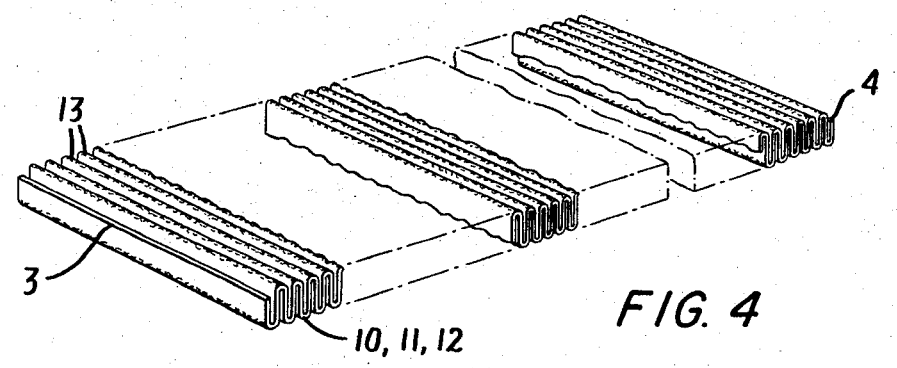
FIG. 4 shows the material of FIG. 3 after it has been corrugated, with the ends of the sheet folded over, cut to the correct width, and ready for application of the bonding agent.
Figure 5:
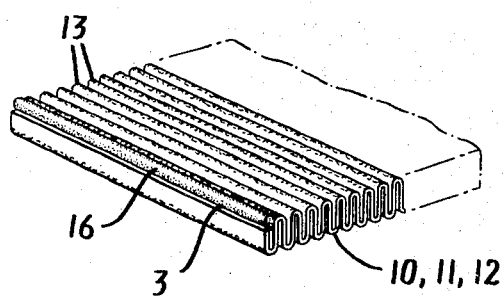
Figure 6:
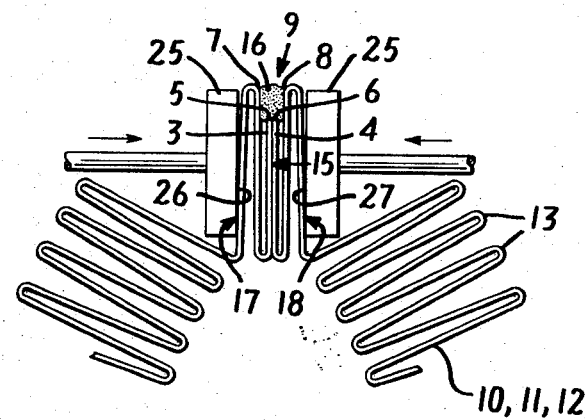

FIG. 5 shows the sheet of corrugated filter material of FIG. 4 after the self-sustaining tape of bonding agent has been applied to the space provided at the side seam; and FIG. 6 shows the corrugated sheet of FIG. 5 after folding in cylindrical form with the two edges brought together in a seam, with a tape of bonding agent in the space therebetween, and the heating platens in the position of application of heat thereto, to complete the side seam seal.

The filter elements in accordance with the invention are readily prepared from filter sheet material, by corrugating and forming in the usual way. The only difference in fact from the usual process of manufacturing is in the formation of the side seam seal. FIGS. 3 to 6 inclusive show the various steps in the formation of the filter element.

In the filter element of the invention, one embodiment of which is shown in FIGS. 1 to 6, the sheet material 10, together with enclosing coarser protective layers 11 and 12, is formed generally in corrugations 13, forming a cylinder 14 of the desired length. In this case, the side seam 15 is formed by folding the two inner faces 1, 2 of the ends 3, 4 of the inside sheet 11 (and at the same time the adjacent ends of the sheets 10, 12) so that they lie face-to-face in closely-abutting contact, with their edges 5, 6 short of the span of one corrugation fold, in this case approximately ⅛ inch less than the length of such fold. The opposite outer faces 7, 8 of the next adjacent folds 17, 18 are thus face-to-face, beyond the edges 5, 6 of the filter sheet 12 (and 10, 11). A space 9 in the form of an open channel or trough is thus formed between these inner faces 7, 8 and the edges 5, 6 of the filter sheets 10, 11, 12 beyond the seam 15. A tape or ribbon of adhesive 16 placed in this space, when melted and thereafter solidified, forms a leak-proof seal therewith. This trough can be on the inside or on the outside of the cylinder 14.

It is apparent from the drawing that in this type of seam the layer of bonding agent does not extend from the inner sheet 11 to the outer sheet 12 of the cylinder. In fact, it is confined to the space 9, and does not extend into the seam 15 at all. Yet, it provides a firm and leak-proof bond between the outer faces of the penultimate corrugation folds 17, 18 of the sheets at their ends, by virtue of having easy access to the ends of filter sheet 10. The result is that the portions of the sheets 10, 11, 12 in the seam 15 are quite free from adhesive. Consequently, when the potting compound 19 used to bond the ends of the filter cylinder to the end caps 20, 21 is put in place, it can impregnate the ends 22, 23 of the filter sheets 10, 11, 12 throughout the circumference of the cylinder 14 without interference by the adhesive 16 bonding the seam together, and there is accordingly no potential leakage path from the inner to the outer face of the cylinder afforded by the adhesive layer.

Figure 1:
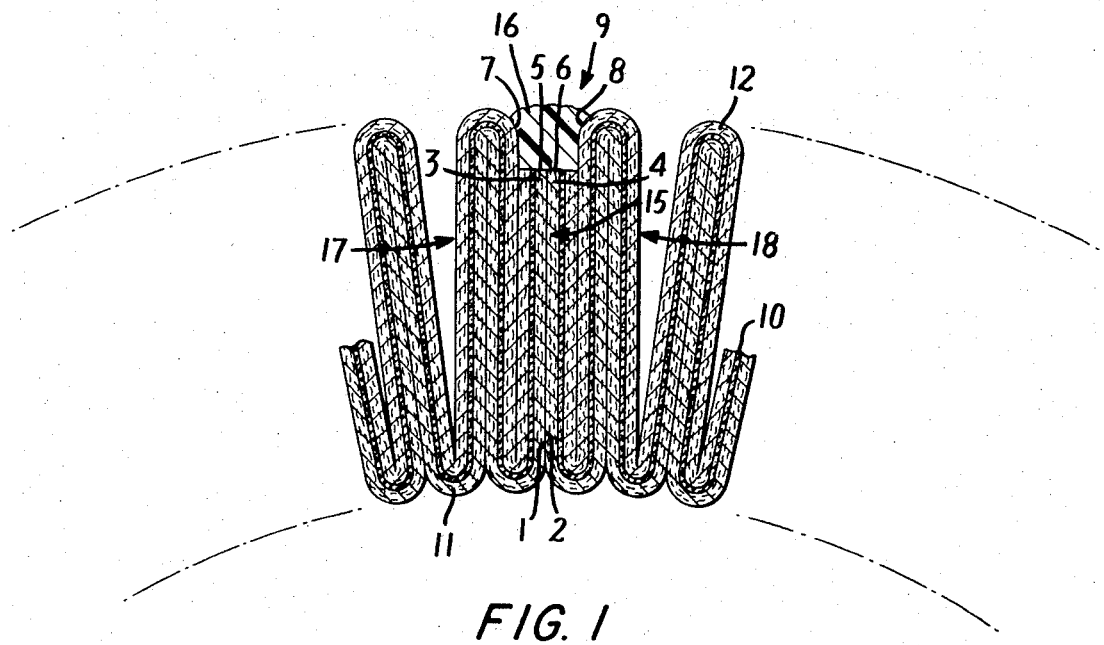
FIG. 1 shows in cross-section a filter element in cylindrical corrugated form, having a side seam seal in accordance with the invention.
Figure 2:
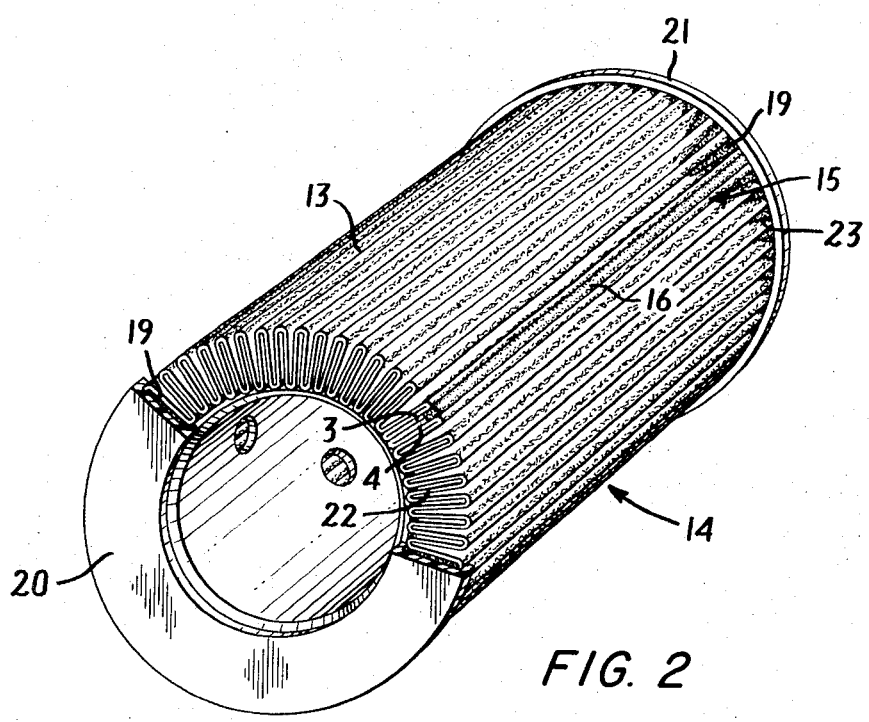
FIG. 2 is a perspective end view of the filter element of FIG. 1.
Figure 3:
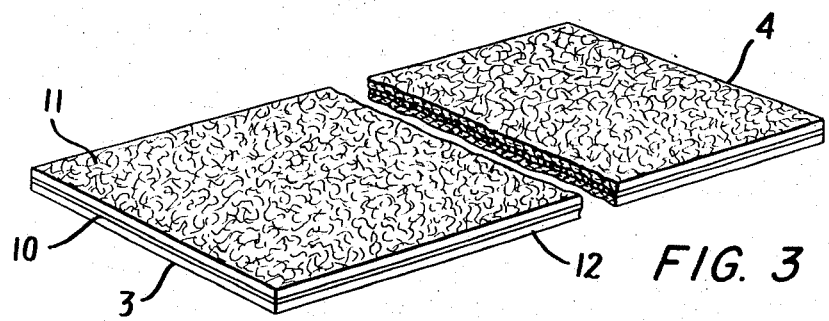
FIG. 3 shows the sheet of filter material sandwiched between the two protective layers and ready for corrugation, as the first step in forming a filter element having a side seam seal in accordance with the invention.

In forming the cylinder filter element with this type of side seam seal, as seen in FIG. 3, a flat sheet 10 of filter material with any desired protective coarse layers 11, 12 of the type shown in FIGS. 1 and 2 is first put in corrugated form, as shown in FIG. 4, thus forming the filter sheet composite 10, 11, 12. A ribbon or tape 16 of bonding agent (which is self-sustaining and of the desired width and thickness to completely fill the space 9 between the inner faces of the penultimate folds 17 and 18 of the cylinder, corresponding to the widths of two thicknesses of the filter sheet 10 plus two thicknesses of any protective layers 11, 12 to form a leak-proof seal there, as shown in FIGS. 1 and 2) is then placed on the outside face of the filter sheet 12 at the right location. The tape can be bonded thereto by adhesive, but this is not essential. The resulting composite is shown in FIG. 5.

The corrugated three-layered composite sheet is then folded into a cylinder, and the two ends 3, 4 of the composite sheet brought together in such a manner that the inner faces 1, 2 of sheet 11 are in face-to-face relationship, and the outer faces 7, 8 of the penultimate folds 17, 18 of the filter sheet ends 3, 4 are also in face-to-face relationship, with the tape 16 of adhesive agent therebetween, filling the space 9 between these faces, beyond the edges 5, 6 of the filter sheet, all as shown in FIG. 5. Two platens 25 which should be heated to a temperature sufficient to bond the tape of bonding agent to surfaces 5, 6, 7, 8 are then brought into contact with the outside faces 26, 27 of the penultimate folds 17, 18 of the cylinder 14, and heat, or heat and pressure, applied through the two thicknesses of the sheet material 10 to the tape. The result is a side seam seal, as shown in FIGS. 1 and 2.

Means for heating, or for applying heat and pressure, other than hot platens, may be used. For example, the corrugated pack may be confined in an outer jacket of configuration such that the faces 1 and 2 and 17 and 18 are in the required abutting and opposing configuration, the adhesive placed in the pocket so formed, and the element placed in an oven to polymerize the adhesive. Two component liquid adhesives which set at room temperature may be used, rendering the use of heat superfluous.

It will be understood that a single sheet may be used to form the cylinder in which case the side seam seal is formed between the ends of such sheet.

The resulting cylinder is ready for use as a filter element, or as a base for deposition of a surface coating thereon to modify its filtration characteristics. As indicated, cylinders of this type are provided with end caps to close off the interior space enclosed by the element, and give control of the flow of filtrate. One or both of the end caps can be provided with flow passages for filtrate flow. The caps can be of any desired material, appropriate to the system and the need, and are bonded to the cylinder ends in a leak-proof seal, by appropriate bonding agents. All of this is conventional and well known to those skilled in this art, and forms no part of the instant invention. Melt-sealed end caps, as disclosed in U.S. Pat. No. 3,457,339, patented July 22, 1969, to David B. Pall, et al., may be used.

The filter elements of the invention can be formed of any porous sheet material having pores extending from surface to surface. One or several layers of the same or varying porosity, and one or more of which may act as prefilters can be employed, in close juxtaposition, or even bonded together, or also spaced apart. Layers such as open-weave meshes may be added, to permit free flow of fluid up and/or downstream of the fine filter layer. Paper, which can, if desired, be resin impregnated, is a preferred base material, since it yields an effective, versatile and inexpensive fluid-permeable filter medium. The invention is, however, applicable to papers and like sheet materials formed of any type of fiber, including not only cellulose fibers but also synthetic resin fibers and fibers of other cellulose derivatives including, for example, fibers of polyvinyl chloride, polyethylene, polypropylene, polyvinylidene chloride, cellulose acetate, cellulose acetate propionate, viscose rayon, polyacrylonitrile, polymers of terephthalic acid and ethylene glycol, polyamides, and protein fibers of various sorts, such as zein and the alginates, glass, asbestos, potassium titante, mineral wool, polystyrene, rubber, casein, hemp, jute, linen, cotton, silk, wool, and mohair. Also useful, in addition to papers, are textile fabrics, and woven and nonwoven fibrous layers of all kinds such as felts, mats and bats made of fibrous materials of any of the types listed above.

The sheet material should in most cases be sufficiently rigid to be self-supporting when folded in cylindrical form, but if it is not, a rigid core of metal, plastic or other hard material can be provided as an interior support.

Also, the filter sheet material of which the filter elements of the invention are made can be, if desired, impregnated with a synthetic resin or cellulose derivative to increase its strength and resistance to wear by the fluid being filtered. The impregnating agent can be any material useful in the impregnation of papers and textile materials. Such materials are well known in the paper and textile arts, and form no part of the instant invention. The impregnating agents can be in liquid form, capable of undergoing solidification as by polymerization, cross-linking, or the like. They can also be in solid form, and applied to the base from a solution in an inert solvent, or as melts. Representative impregnating resins include phenol-formaldehyde resins, urea-formaldehyde resins, melamine-formaldehyde resins, polyester resins, and polyepoxide resins.

The tape or ribbon of bonding agent can be of any synthetic resin or cellulose derivative film sufficiently thick and strong to be self-supporting. The thickness will be appropriate to the sheet filter material. A rough-surfaced material will require a thicker tape than a smooth-surfaced material. Usually, a film of from 0.25 to 5 mm in thickness will be satisfactory.

Typical materials are polyvinyl chloride, polyvinylidene chloride, polyacrylonitrile, polyethylene, polypropylene, rubber, polymers of terephthalic acid and ethylene glycol, polyamides, cellulose acetate, ethyl cellulose, polyesters, polyepoxides, polystyrene, polyisobutylene, urea-formaldehyde, phenol-formaldehyde, melamine-formaldehyde, polytetrafluoroethylene, and polytrifluorochloroethylene resins.

A thermoplastic or pressure-sensitive bonding agent can be bonded to the juxtaposed sheet surfaces by application of heat and pressure. A thermosetting resin such as the phenol-formaldehyde, urea-formaldehyde, and polyepoxide resins can be used in an incompletely polymerized stage wherein they are still thermoplastic pr pressure-sensitive, and converted to a thermoset nonthermoplastic stage of polymerization under the application of heat and pressure so as to make a leak-proof seal that is also permanent.

In the case in which the sheet filter material is impregnated with an impregnating resin for greater strength, and the resin is in an incomplete stage of polymerization, the curing of the resin impregnant and of the resin tape can be effected simultaneously. The filter material also can be given an oven or like heat treatment after formation of the side seam seal, to complete the cure of any impregnant and of the tape bonding agent.

In lieu of the tape or ribbon, a fluid bonding agent or adhesive can be used, flowed into the space where bonding is to be effected. The cylinder is placed with this space uppermost, and the ends of the trough closed off with caps or other means to retain the fluid there until it hardens. Any of the materials named above for the tape or ribbon can be used, in molten condition, in solution, in a solvent, or in a liquid non- or partially-polymerized condition, and brought to a solid stage of polymerization thereafter.

Having regard to the foregoing disclosure, the following is claimed as the inventive and patentable embodiments thereof:

1. A filter element comprising filter sheet material formed in a substantially cylindrical shape, and having opposite sheet end portions folded over with outer and inner end surfaces in adjacent relation and joined together in a side seam seal, wherein portions of the sheet adjacent the sheet ends have one surface in face-to-face closely-abutting contact, extending to the end edges of the sheet, and the next-adjacent portions have the other surface opposite each other, extending beyond the end edges of the end portions of the sheet, and spaced apart by the folded-over abutting sheet ends, the opposed surfaces of the sheet ends and the end edges of the sheet ends defining a space therebetween, with a bonding agent in the space bonding the sheets together at the end edges and the opposed surfaces of the sheet substantially without penetrating the face-to-face end portions of the sheet at the seam to the outer surface of the filter sheet.

2. A filter element in accordance with claim 1, wherein the filter sheet material is a paper.

3. A filter element in accordance with claim 1, wherein the bonding agent is a synthetic resin.

4. A filter element in accordance with claim 1, having end caps closing off the ends of the cylinder and bonded to the ends in a leak-tight seal.

5. A filter element in accordance with claim 4, wherein the end caps are bonded to the ends of the cylinder by a synthetic resin which impregnates the filter sheet material at such ends.

6. A filter element in accordance with claim 1, in which the sheet material is folded in a corrugated configuration.

7. A filter element in accordance with claim 6, in which the sheet end portions in face-to-face relationship in the side seam seal each comprise the first and second corrugations of the sheet material from the ends.

8. A filter element in accordance with claim 7, in which the sheet material comprises paper.

9. A filter element in accordance with claim 1, having end caps closing off the ends of the cylinder and melt-bonded to the ends in a leak-tight seal.

10. A filter element in accordance with claim 1, having the filter sheet material sandwiched between protective porous sheets of higher porosity than the filter sheet.

* * * * *